United States Patent
Miller et al.

(10) Patent No.: US 8,769,430 B2
(45) Date of Patent: Jul. 1, 2014

(54) MULTI-COLUMN FORMATTED PAGE SCROLLING

(75) Inventors: Steven M. Miller, Cary, NC (US); Lloyd W. Allen, Jr., Cary, NC (US); Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1439 days.

(21) Appl. No.: 11/950,678

(22) Filed: Dec. 5, 2007

(65) Prior Publication Data

US 2009/0150822 A1 Jun. 11, 2009

(51) Int. Cl.
*G06F 3/00* (2006.01)
*G06F 3/048* (2013.01)

(52) U.S. Cl.
USPC ........... 715/784; 715/700; 715/785; 715/786; 715/817; 715/818

(58) Field of Classification Search
USPC ......... 715/241, 700, 784–786, 802, 817–820, 715/864
See application file for complete search history.

(56) References Cited

U.S. PATENT DOCUMENTS

| | | | | |
|---|---|---|---|---|
| 5,060,170 A * | 10/1991 | Bourgeois et al. | ............ | 715/788 |
| 5,805,161 A * | 9/1998 | Tiphane | ........................ | 715/786 |
| 5,874,961 A * | 2/1999 | Bates et al. | ................... | 715/786 |
| 5,877,760 A * | 3/1999 | Onda et al. | .................... | 715/784 |
| 5,903,267 A * | 5/1999 | Fisher | ............................ | 715/786 |
| 5,943,051 A * | 8/1999 | Onda et al. | .................... | 715/786 |
| 5,999,176 A * | 12/1999 | Kamper | ........................ | 715/787 |
| 6,020,887 A * | 2/2000 | Loring et al. | ................. | 715/786 |
| 6,141,007 A * | 10/2000 | Lebling et al. | ................ | 715/792 |
| 6,421,071 B1 * | 7/2002 | Harrison | ........................ | 715/787 |
| 6,912,694 B1 * | 6/2005 | Harrison et al. | ............... | 715/784 |
| 7,114,129 B2 * | 9/2006 | Awada et al. | ................ | 715/786 |
| 7,320,105 B1 * | 1/2008 | Sinyak et al. | ................. | 715/277 |
| 7,362,311 B2 * | 4/2008 | Filner et al. | ................... | 345/169 |
| 7,428,709 B2 * | 9/2008 | Forstall et al. | ................ | 715/784 |
| 7,487,444 B2 * | 2/2009 | Lira | ............................. | 715/247 |
| 2001/0011364 A1 * | 8/2001 | Stoub | ............................. | 717/1 |
| 2003/0058281 A1 * | 3/2003 | Kepros et al. | ................. | 345/786 |
| 2005/0091604 A1 * | 4/2005 | Davis | ............................ | 715/772 |
| 2005/0210404 A1 * | 9/2005 | Hakiel et al. | .................. | 715/786 |
| 2006/0059436 A1 * | 3/2006 | Nurmi | ........................... | 715/786 |
| 2006/0174212 A1 * | 8/2006 | Cok | ............................. | 715/786 |

(Continued)

OTHER PUBLICATIONS

Comparing the Same Workbook, Feb. 17, 2006, 2 pages.*

(Continued)

*Primary Examiner* — Matt Kim
*Assistant Examiner* — Yongjia Pan
(74) *Attorney, Agent, or Firm* — Lee Law, PLLC; Christopher B. Lee

(57) ABSTRACT

The present invention is directed to a method and system for scrolling in a document having multiple columns. A method for scrolling in a page of a document having multiple columns, includes: displaying a plurality of the columns in a display window; associating a different scrollbar with each of the plurality of displayed columns; and selectively enabling a synchronous or independent operation of each of the scrollbars; wherein in synchronous operation, a use of any of the scrollbars results in a corresponding scrolling of the page within the display window, and wherein in independent operation, a use of a selected one of the scrollbars results only in a corresponding scrolling of the column of the page associated with that scrollbar within the display window.

18 Claims, 10 Drawing Sheets

(56) References Cited

U.S. PATENT DOCUMENTS

| | | | |
|---|---|---|---|
| 2006/0174214 A1* | 8/2006 | McKee et al. | 715/802 |
| 2006/0200764 A1* | 9/2006 | Sellers et al. | 715/526 |
| 2006/0236261 A1* | 10/2006 | Forstall et al. | 715/784 |
| 2006/0277488 A1* | 12/2006 | Cok et al. | 715/784 |
| 2012/0005623 A1* | 1/2012 | Ishak et al. | 715/786 |

OTHER PUBLICATIONS

Scroll 2 divs with one scrollbar, May 20, 2006, 2 pages.*
S. Scott Zimmerman, Beverly B. Zimmerman, Ann Shaffer, Katherine T. Pinard, New Perspectives on Microsoft Office Word 2007, Aug. 21, 2007, 3 pages.*
Diane Koers, Microsoft Word 2003 Fast & Easy, Oct. 23, 2003, 3 pages.*
Scrolling textareas in sync with Firefox, Jul. 23, 2005, 5 pages.*
Frames in HTML documents, Aug. 16, 2000, 10 pages.*
Mohammad Al-Ubaydli and Chris Paton, The Doctors PDA and Smartphone Handbook: Medical references, Mar. 2006, 5 pages.*
Edward W. Ishak and Steven K. Feine, Content-Aware Scrolling, 2006, 4 pages.*
Apostolos Antonacopoulos, Jianying Hu, Web Document Analysis: Challenges and Opportunities, Jan. 1, 2003, 15 pages.*
Reflow the contents of Adobe PDF documents, Apr. 15, 2001, 3 pages.*
Using Accessible PDF Documents with Adobe Reader 7.0 A Guide for People with Disabilities, May 19, 2005, 74 pages.*
Dan Gookin, Word 2007 for Dummies, Dec. 2006, 5 pages.*

* cited by examiner

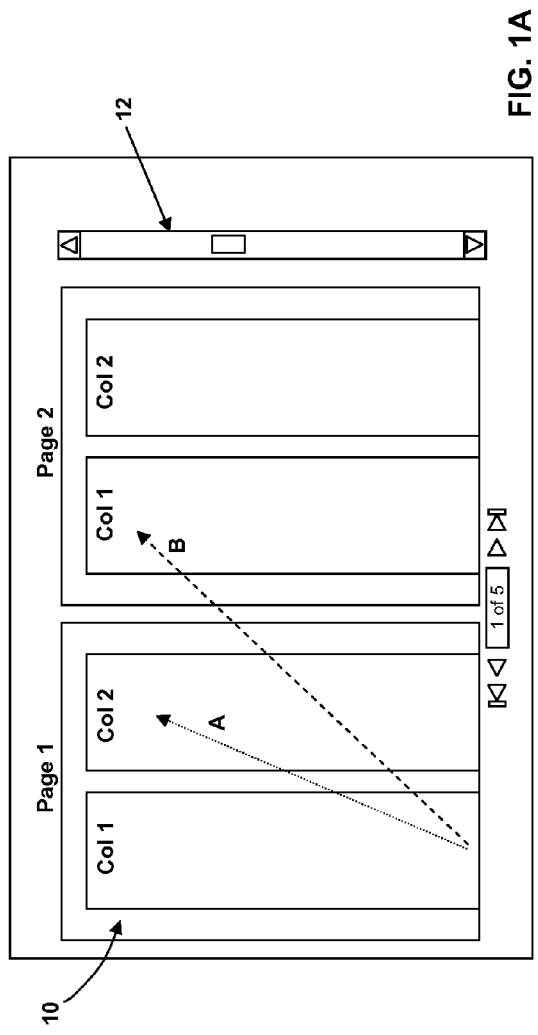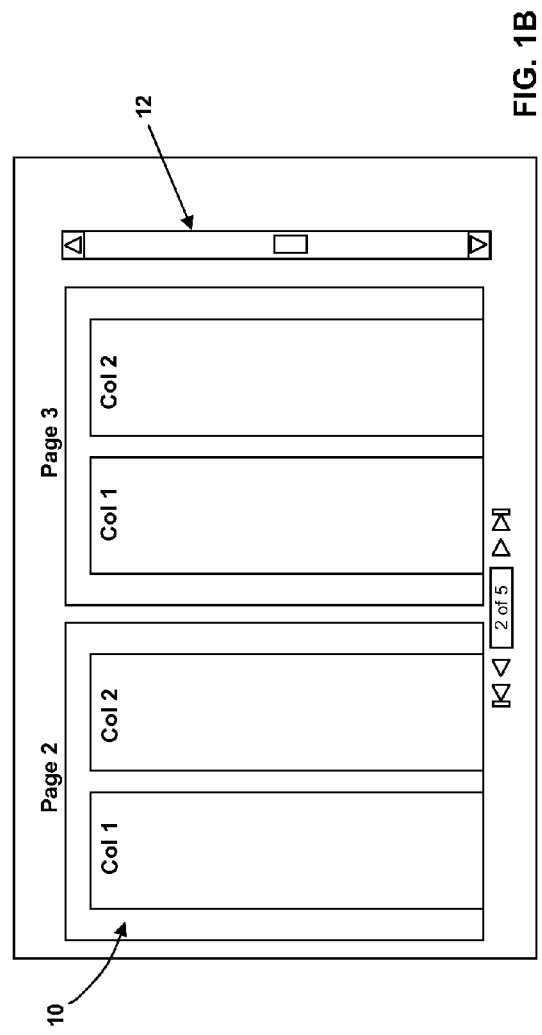

MULTI-COLUMN FORMATTED PAGE SCROLLING

FIELD OF THE INVENTION

The present invention relates to user interfaces, and more specifically relates to a method and system for scrolling in a document having multiple columns.

BACKGROUND OF THE INVENTION

When scrolling in a document containing data (e.g., text, images, etc.) in multiple columns (e.g., in a PDF file, text file, etc.), a reader is often hampered by a scrollbar that "jumps" to the next page in the document when the bottom of the first column on a current page is reached, even though the reader may want to continue reading on the top of the next column on that page. To this extent, the reader must navigate back to the desired page by scrolling up or actuating a back button, which interrupts the flow of reading.

An example of this problem is depicted in FIGS. 1A and 1B. In FIG. 1A, assume the reader is reading the text in column 1 on page 1 of a document 10. When the reader scrolls down to the bottom of column 1 on page 1 (e.g., using the scroll bar 12), intending to continue reading the text in column 2 on page 1, as indicated by directional arrow A, a further actuation of the scrollbar instead causes a "jump" to column 1 of page 2, as indicated by directional arrow B, such that page 1 is no longer displayed. In this case, the document 10 is now displayed as depicted in FIG. 1B. The reader must then navigate back to page 1 by scrolling up (e.g., using the scrollbar 12), by actuating a back button 14, etc., which interrupts the flow of reading.

Accordingly, there is a need for a solution that addresses these and other deficiencies of the related art.

SUMMARY OF THE INVENTION

The present invention is directed to a method and system for scrolling in a document having multiple columns.

A first aspect is directed to a method for method for scrolling in a page of a document having multiple columns, comprising: displaying a plurality of the columns in a display window; associating a different scrollbar with each of the plurality of displayed columns; and selectively enabling a synchronous or independent operation of each of the scrollbars; wherein in synchronous operation, a use of any of the scrollbars results in a corresponding scrolling of the page within the display window, and wherein in independent operation, a use of a selected one of the scrollbars results only in a corresponding scrolling of the column of the page associated with that scrollbar within the display window.

A second aspect is directed to a method for scrolling in a page of a document having multiple columns, comprising: displaying a portion of a column of the page in a display window; and scrolling through the multiple columns of the page using a single scrollbar; wherein the multiple columns of the page are displayed as a single virtual column in the display window in response to the scrolling.

A third aspect is directed to a system for scrolling in a page of a document having multiple columns, comprising: a system for displaying a plurality of the columns of the page in a display window; and a scrolling system for scrolling through the page, the scrolling system comprising: a system for associating a different scrollbar with each of the plurality of displayed columns; and a system for selectively enabling a synchronous or independent operation of each of the scrollbars; wherein in synchronous operation, a use of any of the scrollbars results in a corresponding scrolling of the page within the display window, and wherein in independent operation, a use of a selected one of the scrollbars results only in a corresponding scrolling of the column of the page associated with that scrollbar within the display window.

A fourth aspect is directed to a handheld device, comprising: a display window for displaying a portion of a column of a page of a document; and a scrolling system for scrolling through the multiple columns of the page using a single scrollbar; wherein the multiple columns of the page are displayed as a single virtual column in the display window in response to the scrolling.

A fifth aspect is directed to a program product stored on a computer readable medium, which when executed, provides scrolling in a page of a document having multiple columns, the computer readable medium comprising program code for at least one of: A) displaying a plurality of the columns in a display window; associating a different scrollbar with each of the plurality of displayed columns; and selectively enabling a synchronous or independent operation of each of the scrollbars; wherein in synchronous operation, a use of any of the scrollbars results in a corresponding scrolling of the page within the display window, and wherein in independent operation, a use of a selected one of the scrollbars results only in a corresponding scrolling of the column of the page associated with that scrollbar within the display window; or B) displaying a portion of a column of the page in a display window; and scrolling through the multiple columns of the page using a single scrollbar; wherein the multiple columns of the page are displayed as a single virtual column in the display window in response to the scrolling.

A sixth aspect is directed to a method for deploying an application for scrolling in a page of a document having multiple columns, comprising: providing a computer infrastructure being operable to perform the methods of the present invention disclosed herein.

The illustrative aspects of the present invention are designed to solve the problems herein described and other problems not discussed.

BRIEF DESCRIPTION OF THE DRAWINGS

These and other features of the present invention will be more readily understood from the following detailed description taken in conjunction with the accompanying drawings.

FIGS. 1A and 1B depict scrolling in a document containing text in multiple columns in accordance with the related art.

Figure 2:
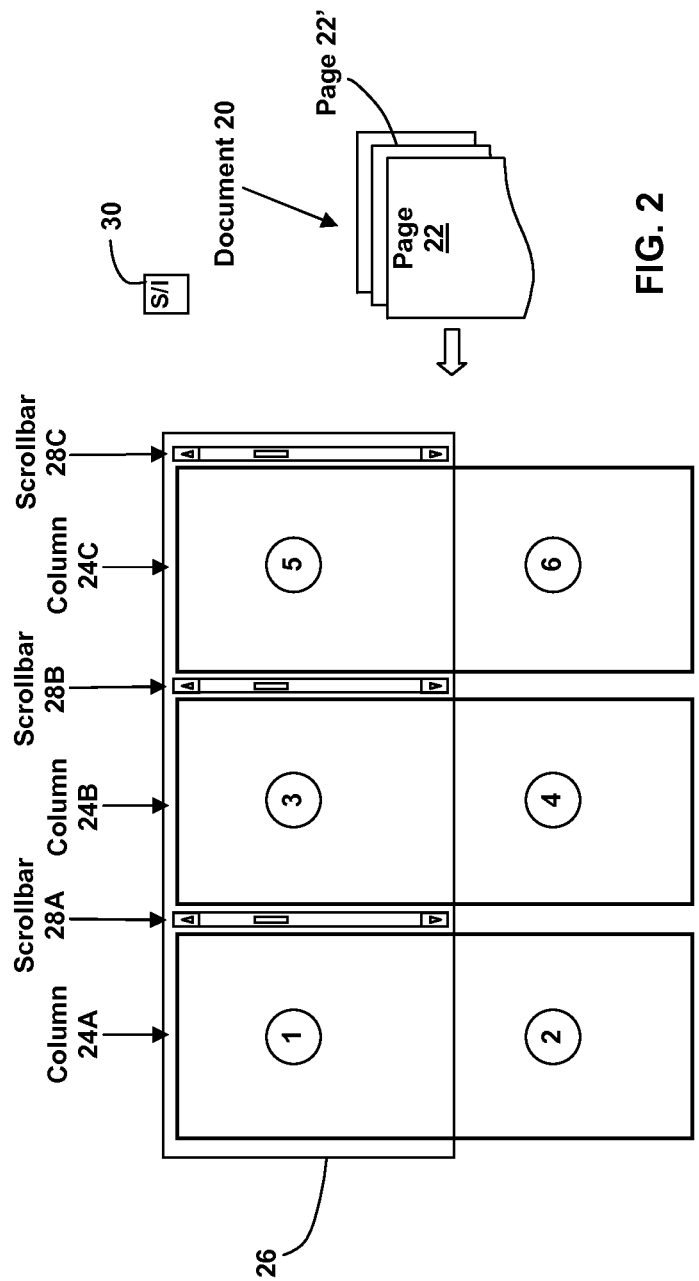
FIGS. 2-3 depict a synchronized scrolling methodology for a page in a document having multiple columns in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention is directed to a method and system for scrolling in a document having multiple columns.

FIG. 2 depicts a scrolling methodology for a page 22 in a document 20 having multiple columns 24A, 24B, and 24C in accordance with an embodiment of the present invention. A display window 26 of a graphical user interface (GUI) indicates the portion of the page 22 that is displayed at any given time on a display. In this example, the page 22 includes three columns 24A, 24B, and 24C, each associated with a different scrollbar 28A, 28B, and 28C, respectively, in the display window 26. Although the page 22 of the document 20 is described as including three columns 24A, 24B, and 24C, it should be apparent to one skilled in the art that this and other embodiments of the present invention can be used in conjunction with document pages containing any plurality (i.e., two or more) of columns.

The scrollbars 28A, 28B, and 28C can be can be operated synchronously or independently. A reader can selectively enable the synchronous or independent operation of the scrollbars 28A, 28B, and 28C using any suitable control mechanism 30 such as a button, check box, radio button, menu selection, contextual menu, keyboard shortcut, function key, user preference, and/or the like.

When synchronous operation of the scrollbars 28A, 28B, and 28C is enabled via the control mechanism 30, operation of any of the scrollbars 28A, 28B, 28C causes a corresponding down/up scrolling of the entire page 22 within the display window 26. For example, in FIG. 2, the columns 24A, 24B, and 24C of the page 22 are shown as having a paging sequence of sections 1, 2, 3, 4, 5, and 6, with the sections 1, 3, and 5 of the page 22 simultaneously displayed within the display window 26.

Figure 3:
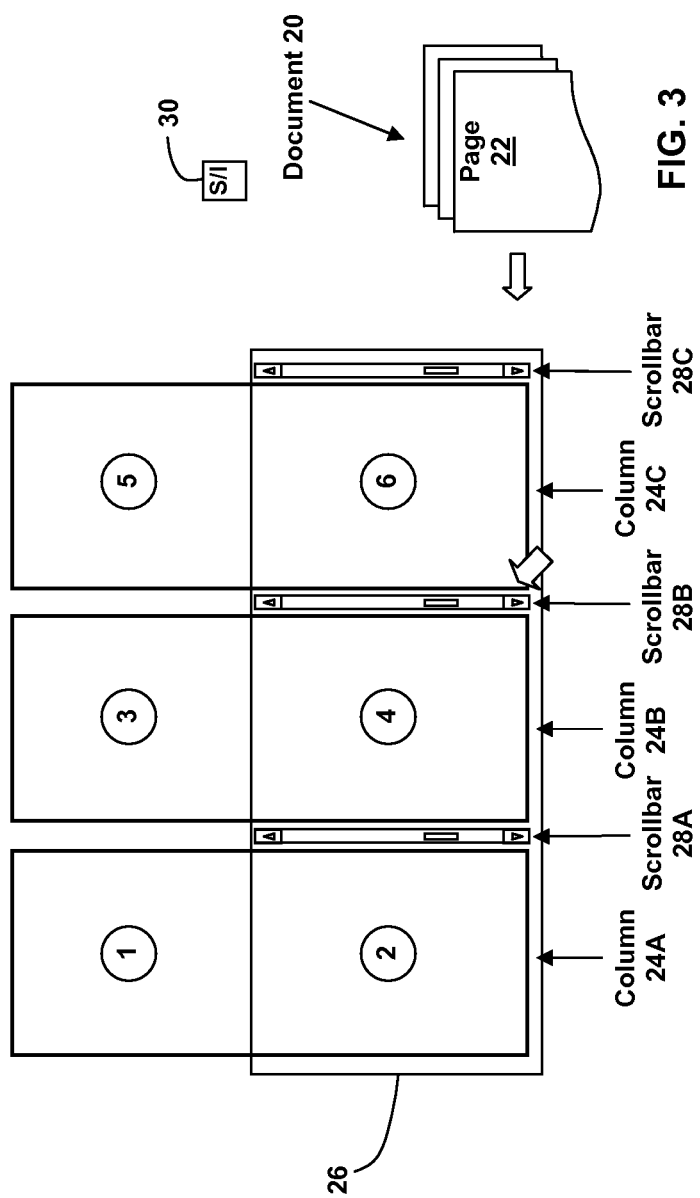

As depicted in FIG. 3, with synchronous scrolling enabled, a reader can scroll down to display sections 2, 4, and 6 of the page 22 in the display window 26 using any of the scrollbars 28A, 28B, 28C (e.g., scrollbar 28B as shown). Unlike the related art, however, the display window 26 does not automatically "jump" to the next page 22' of the document 20 when the scrolling reaches the bottom of the page 22. Using this technique, a reader can scroll down/up to sequentially view sections 1, 2, 3, 4, 5, and 6 of the page 22 in the display window 26 using any of the scroll bars 28A, 28B, and 28C.

In another embodiment of the present invention, a reader can selectively allow the display window 26 to "jump" to the next page 22' of the document 20 in response to the use of a predetermined scrollbar (e.g., scrollbar 28C), during the synchronous operation of the scrollbars 28A, 28B, and 28C. For example, when a reader scrolls down to the bottom of the page 22 using the scrollbar 28C, the display window 26 can be configured to display the top of the next page 22' of the document 20. Operation of the scrollbars 28A, 28B, however, still provides for the synchronous scrolling of the page 22 within the display window 26 as detailed above, and does not cause the display window 26 to "jump" to the next page 22' of the document 20. Other methodologies for selectively allowing the display window 26 to "jump" to the next page 22' of the document 20 can also be used. For example, this function can be enabled via any suitable control mechanism such as a button, check box, radio button, menu selection, contextual menu, keyboard shortcut, function key, user preference, and/or the like.

This process is also applicable to upward scrolling. For example, a reader can selectively allow the display window 26 to "jump" to a previous page (if any) of the document 20 in response to the use of a predetermined scrollbar (e.g., scrollbar 28A), during the synchronous operation of the scrollbars 28A, 28B, and 28C. For example, when a reader scrolls up to the top of the column 24A on the page 22 using the scrollbar 28A, the display window 26 can be configured to display the top (or bottom) of the previous page of the document 20.

When independent operation of the scrollbars 28A, 28B, and 28C is enabled (e.g., via the control mechanism 30), the scrollbars 28A, 28B, and 28C can be used to independently scroll through the columns 24A, 24B, and 24C, respectively, of the page 22 in the display window 26. As described above with regard to FIG. 2, the sections 1, 3, and 5 of the page 22 are simultaneously displayed within the display window 26. When a reader uses one of the scrollbars 28A, 28B, or 28C, and the independent operation of the scrollbars 28A, 28B, and 28C is enabled, only the column 24A, 24B, and 24C corresponding to that scrollbar scrolls within the display window 26, with the other columns remaining stationary within the display window 26. Use of a scrollbar 28A, 28B, or 28C in this and other embodiments of the present invention can entail, for example, actuation of the scrollbar via a mouse or other pointing device, use of the up/down arrows, page up/down keys, etc., on a keyboard, use of a software-based user interface control (e.g., a "soft button" or on-screen control), use of other special purpose buttons (e.g., a 5-way navigator on a cellular phone or smartphone, and/or the like.

Figure 4:
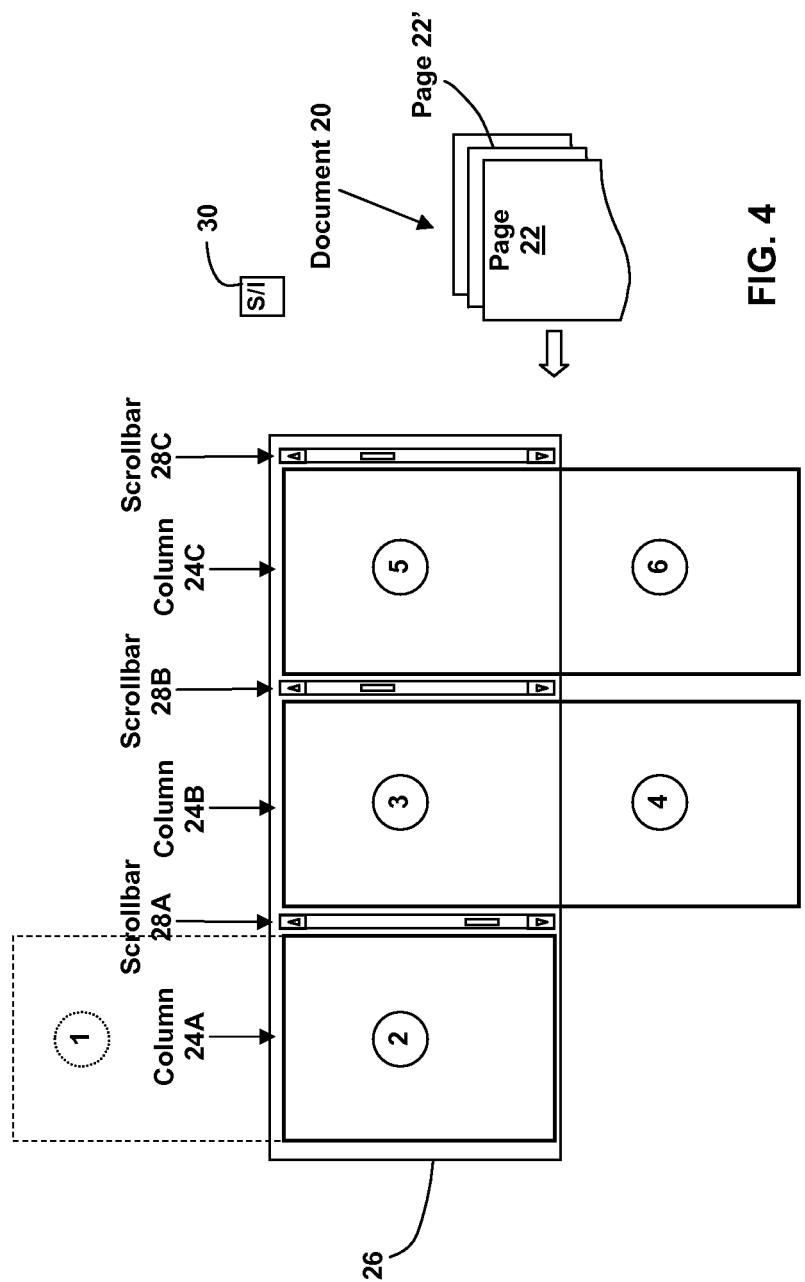
FIGS. 4-5 depict an independent scrolling methodology for a page in a document having multiple columns in accordance with an embodiment of the present invention.
Figure 5:
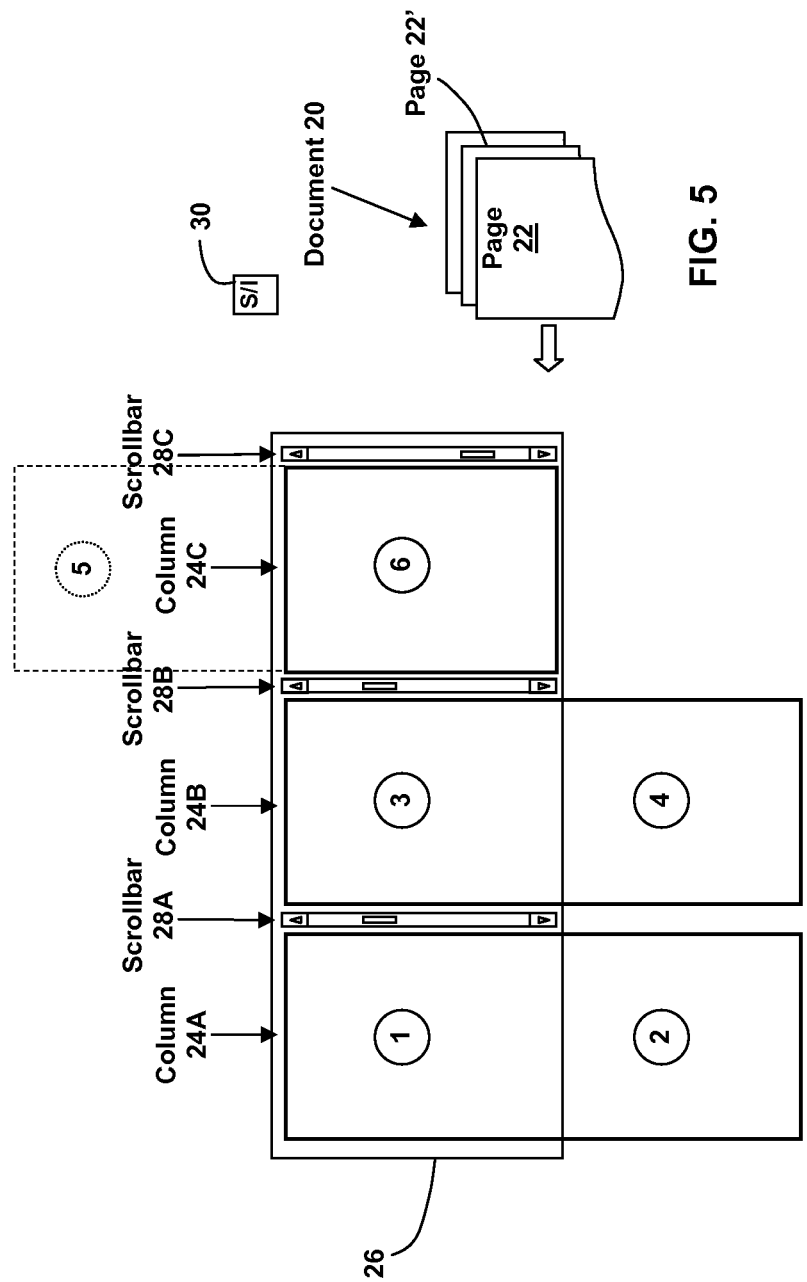

A first example of this process is depicted in FIG. 4. In this case, a reader has used the scrollbar 28A to scroll down from section 1 to section 2 of column 24A. As shown, sections 3 and 5 of columns 24B and 24C, respectfully, of the page 22 remain displayed within the display window 26. Another example of this process is displayed in FIG. 5. In this case, a reader has used the scrollbar 28C to scroll down from section 5 to section 6 of column 24C, with sections 1 and 3 of the columns 24A and 24B, respectfully, of the page 22 remaining displayed within the display window 26.

In another embodiment of the present invention, a reader can selectively allow the display window 26 to "jump" to the next page 22' of the document 20 in response to the use of a predetermined scrollbar (e.g., scrollbar 28C), during the independent operation of the scrollbars 28A, 28B, and 28C. For example, when a reader scrolls down to the bottom of the column 24C using the scrollbar 28C, the display window 26 can be configured to display the top of the next page 22' of the document 20. The bottom of the column 24C can be identified, for example, by a page break, a column break, by the end of data on the page 22, or in any other suitable manner. Operation of the scrollbars 28A, 28B, however, still allows for the independent scrolling of the columns 24A and 24B, respectfully, within the display window 26 as detailed above, and does not cause the display window 26 to "jump" to the next page 22' of the document 20.

In a similar manner, a reader can selectively allow the display window 26 to "jump" to a previous page (if any) of the document 20 in response to the use of a predetermined scrollbar (e.g., scrollbar 28A), during the independent operation of the scrollbars 28A, 28B, and 28C. For example, when a reader scrolls up to the top of the column 24A using the scrollbar 28A, the display window 26 can be configured to display the top (or bottom) of the previous page of the document 20. Again, operation of the scrollbars 28B, 28C, however, still allows for the independent scrolling of the columns 24B and 24C, respectfully, within the display window 26 as detailed above, and does not cause the display window 26 to "jump" to the previous page of the document 20.

In another embodiment of the present invention, the scrollbars 28A, 28B, and 28C can be provided with slightly different capabilities. For example, assume that a reader is reading the data in column 24A of the page 20. When the reader scrolls to the bottom of the column 24A using the scrollbar 28A, the display window 26 displays the data at the top of the next column 24B. Similarly, when the reader scrolls to the bottom of the column 24B using the scrollbar 28B, the display window 26 displays the data at the top of the next column 24C. Finally, when the reader scrolls to the bottom of the column 24C using the scrollbar 28C, the display window 26 "jumps" to the next page 22' in the document 20. Upward scrolling provides analogous functionality.

Figure 6:
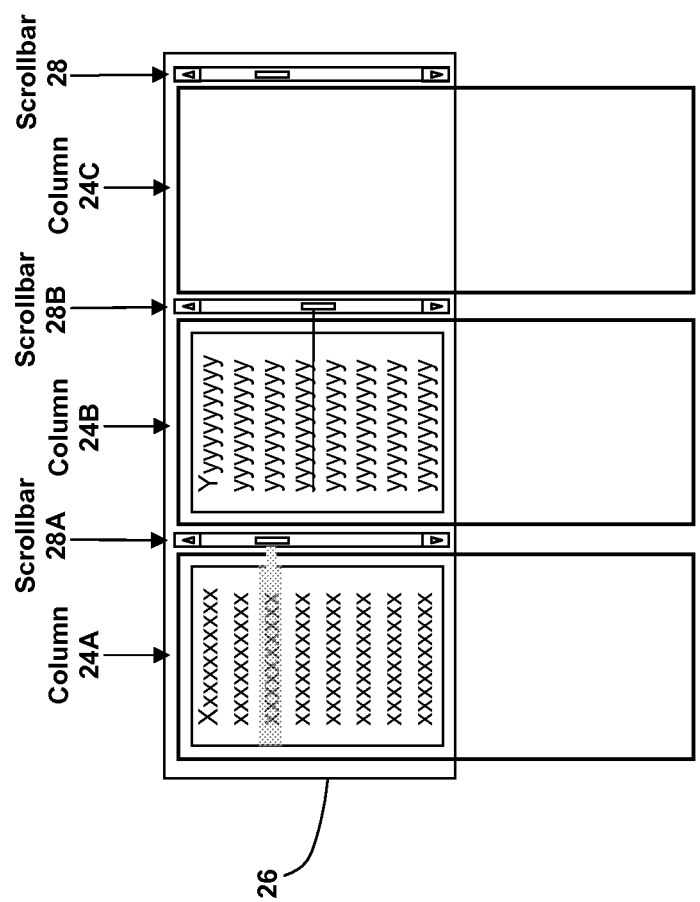
FIG. 6 depicts the highlighting of data in accordance with an embodiment of the present invention.

A reader can optionally enable the highlighting of data (e.g., text) in any of the columns 24A, 24B, and 24C during the independent operation of the scrollbars 28A, 28B, and 28C, respectfully, to aid in the reading of the data. Highlighting can be used, for example, to denote the current reading area and to alter the scrolling behavior, depending on the proximity to the display window boundary and any page or column breaks. If the scrolling operation results in an adjacent logical column being outside of the current view in the display window 26, the viewing region is adjusted based on column inference. Such highlighting can include, for example, highlighting the data in color, underlining the data, bolding the data, and/or the like. Any suitable highlighting can be used in the practice of the present invention. An example of highlighting is depicted in FIG. 6. In this example, the text in column 24A is highlighted using color, while the text in column 24B is highlighted using underlining.

The highlighting of data can be enabled, for example, by "right-clicking" a scrollbar and selecting an option to highlight the data from a contextual menu. Other techniques for enabling highlighting can also be used, for example, using a button, check box, radio button, menu selection, keyboard shortcut, function key, user preference, and/or the like.

Although the display window 26 is shown as displaying all of the columns 24A, 24B, 24C across the page 22, it should be noted that less than all of the columns can be displayed in the display window, depending, for example, on the size of the display being used. For instance, in the above embodiments, the display window 26 may only be large enough to display either the columns 24A and 24B or the columns 24B and 24C. Such small format displays would be expected in a restricted size display of a handheld device, such as a cellular telephone, smartphone, personal digital assistant (PDA) or other such devices. The above functionality can easily be extended to address this type of situation.

Figure 7:
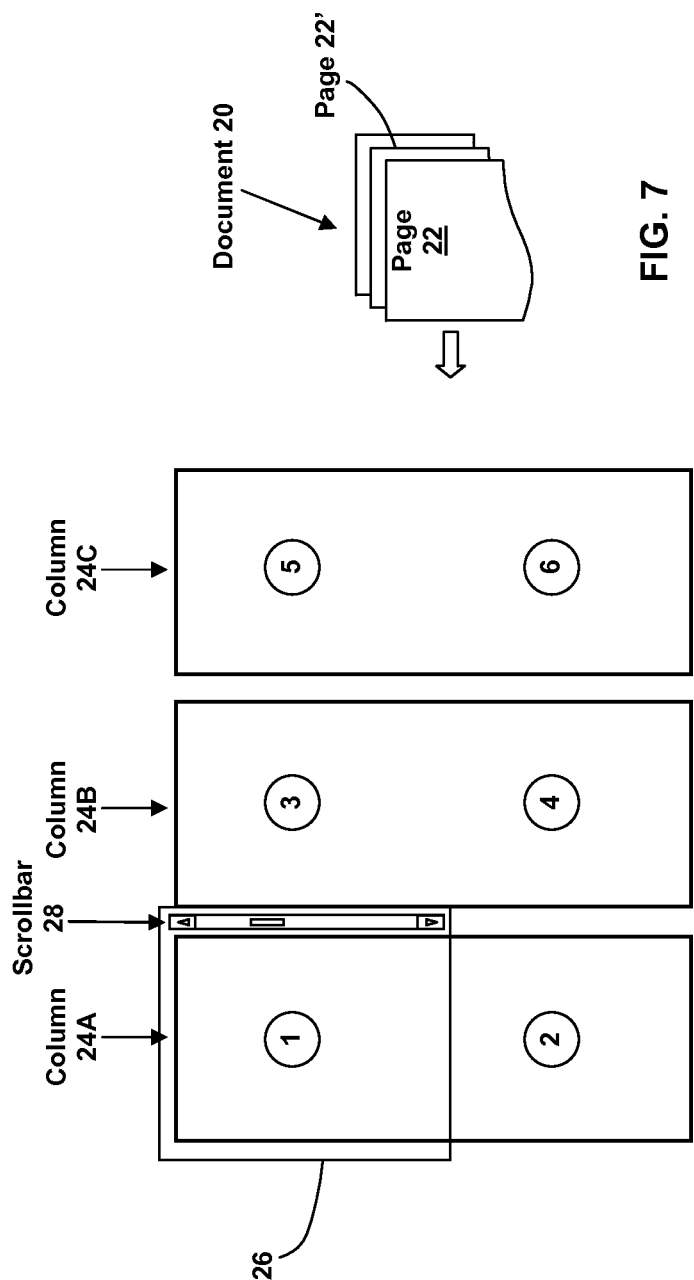
FIGS. 7-9 depict a scrolling methodology for a page in a document having multiple columns in accordance with another embodiment of the present invention.
Figure 8:
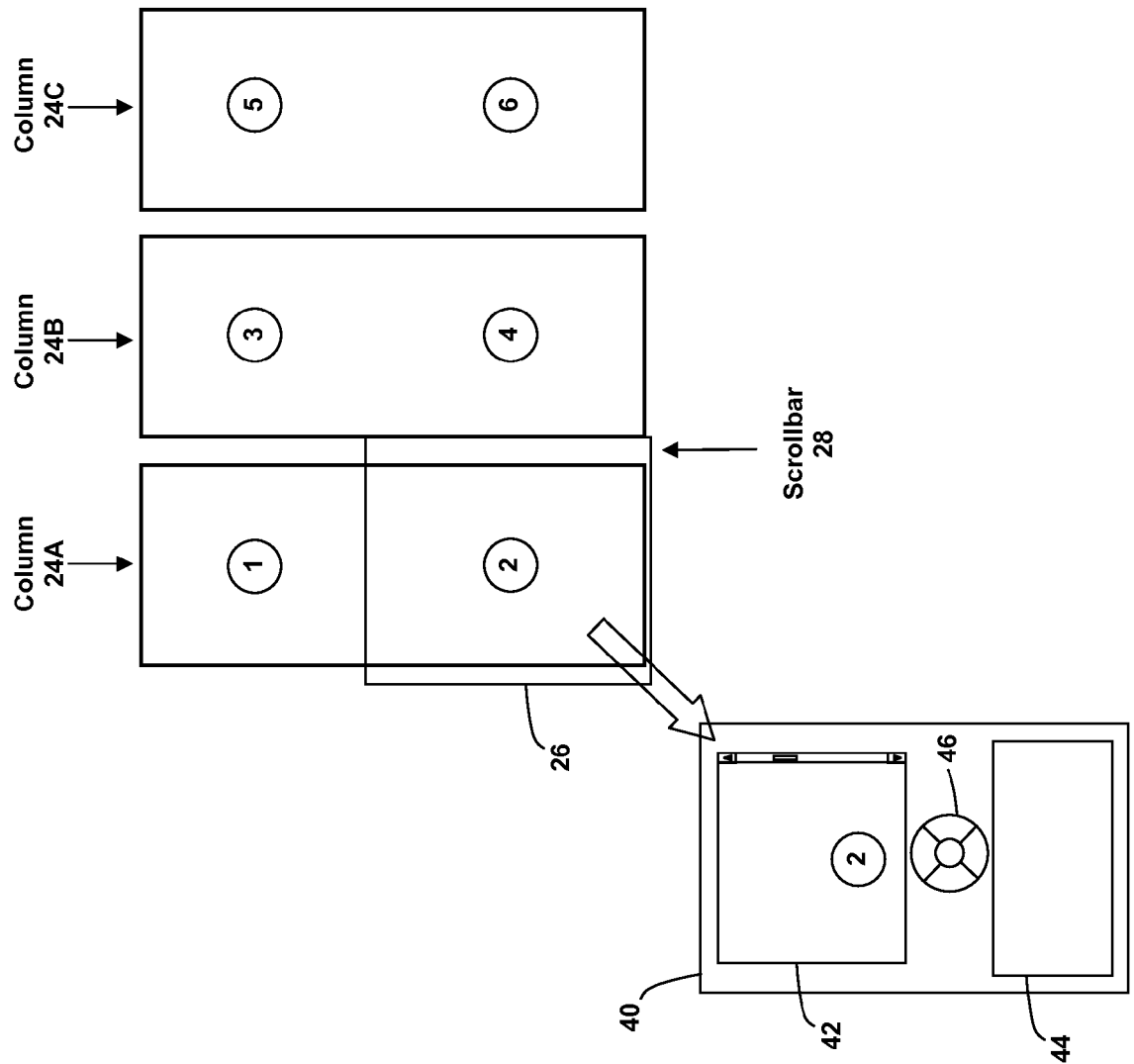
Figure 9:
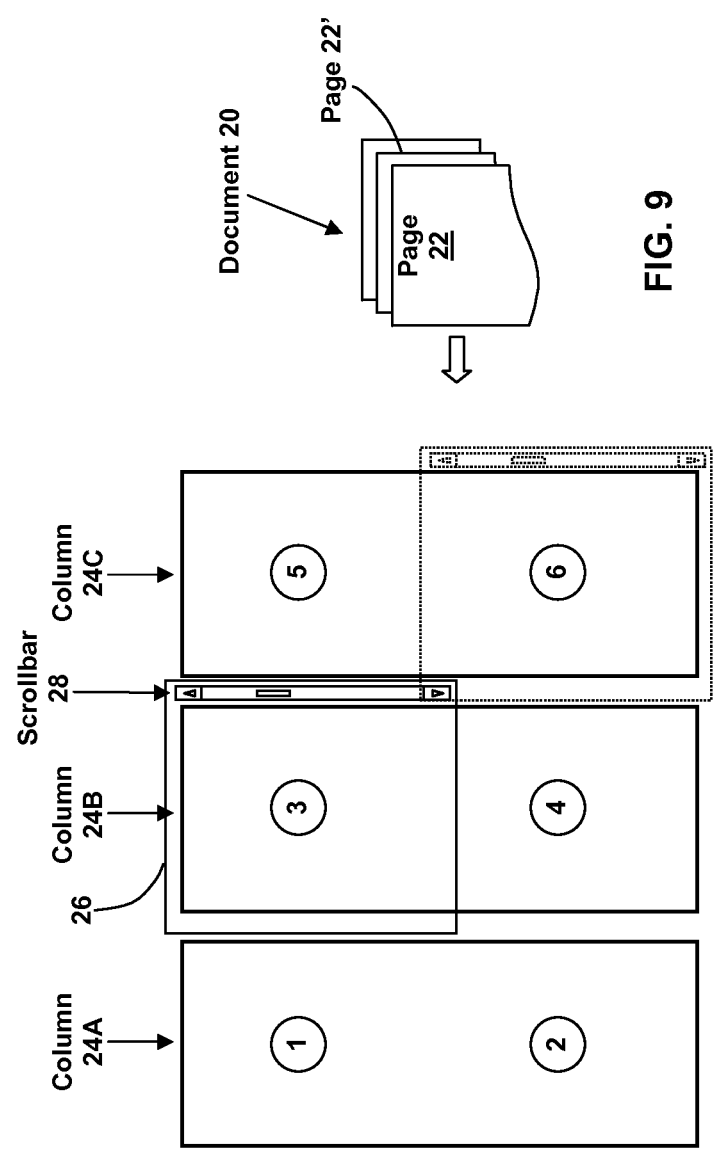

FIGS. 7-9 depict a scrolling methodology for a page in a document having multiple columns in accordance with another embodiment of the present invention. In this embodiment, a single scroll bar is used to scroll columnar data across the columns rather than in a page mode by a combination of horizontal and vertical scroll operations. This embodiment can be used on any size display, but is especially beneficial when used with small format displays.

A page 22 in a document 20 having multiple columns 24A, 24B, and 24C is depicted in FIG. 7. A display window 26 indicates the portion of the page 22 that is displayed at any given time. In this embodiment, a single scrollbar 28 is provided in the display window 26. Again, the columns 24A, 24B, and 24C of the page 22 are shown as having a paging sequence of sections 1, 2, 3, 4, 5, and 6. However, in this case, only a portion of a column 24A, 24B, 24C (e.g., section 1, column 24A) is displayed within the display window.

As a reader scrolls downward to the bottom of the column 24A, the top of the next column 24B (e.g., section 2) is eventually displayed within the display window 26 as depicted in FIG. 8. Continued downward scrolling results in the eventual display of the top of the next column 24B (e.g., section 3) at the top of the page 22 in the display window 26 (FIG. 9). The reader can continue scrolling downward until the bottom of the last column 24C (e.g., section 6) at the bottom of the page 22 is displayed in the display window 26 (shown in phantom in FIG. 9). Thus, the reader can scroll downward through the page 22 and read the sections 1, 2, 3, 4, 5, 6 of the page 22 in sequence in the display window 26. Continued downward scrolling causes the display window 26 to "jump" to the top of the next column on the next page 22' in the document 20. Thus, the columns on the page(s) of the document 20 appear as a single "virtual" column to the reader. Upward scrolling provides analogous functionality.

FIG. 8 also depicts an example of how the display window 26 would map to a small format display 42 of a handheld device 40, such as a cellular phone, PDA, smartphone, etc. As shown, a portion of section 2 of the page 22 is visible on the display 42. A user of the handheld device 40 can scroll up/down through the page 22 of the document 20 to read the various sections of the page 22 and to navigate to the next/previous page(s) of the document 20, using keys on the keyboard 44 (e.g., arrow keys, page up/down keys, etc.), a multi-way navigator 46, or using any other suitable scrolling technique. As detailed above, the columns on the page(s) of the document 20 appear on the display 42 of the handheld device 40 as a single "virtual" column.

Figure 10:
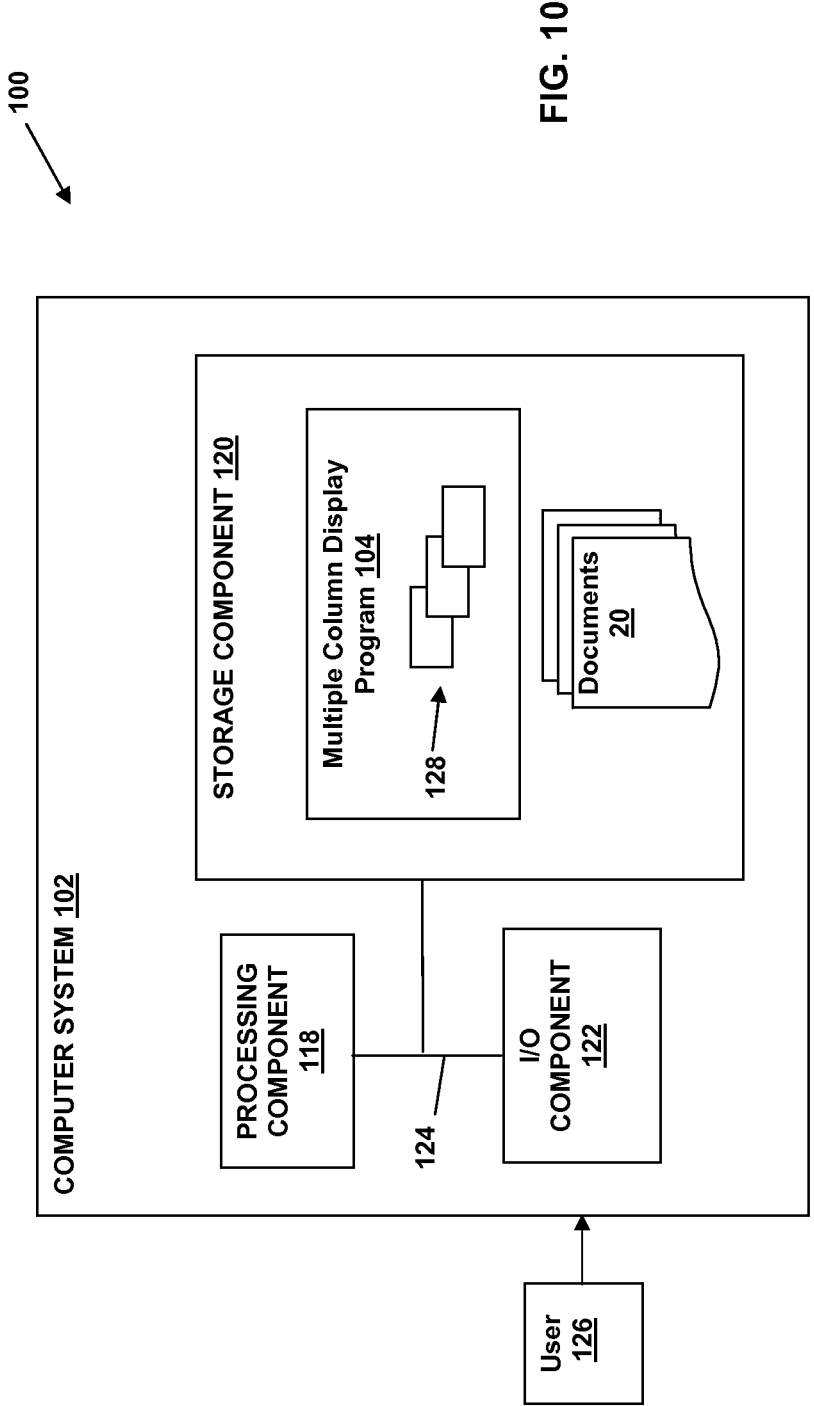
FIG. 10 depicts an illustrative environment for implementing embodiment(s) of the present invention.

FIG. 10 shows an illustrative environment 100 for providing scrolling in a document 20 having multiple columns in accordance with any/all embodiments of the invention. To this extent, environment 100 includes a computer system 102 that can perform the processes described herein. For example, the computer system 102 can be configured to include a multiple column display program 104 for providing scrolling in a document having multiple columns, by performing the processes described herein.

The computer system 102 is shown including a processing component 118 (e.g., one or more processors), a storage component 120 (e.g., a storage hierarchy), an input/output (I/O) component 122 (e.g., one or more I/O interfaces and/or devices), and a communications pathway 124. In general, the processing component 118 executes program code, such as the multiple column display program 104, which is at least partially stored in the storage component 120. While executing program code, the processing component 118 can read and/or write data (e.g., documents 20) to/from the storage component 120 and/or the I/O component 122. The communication pathway 124 provides a communications link between each of the components in computer system 102. The I/O component 122 can comprise one or more human I/O devices (e.g., display, speaker, headphone jack, click wheel, etc.), which enable a human user 126 to interact with the computer system 102, and/or one or more communications devices to enable other computer system(s) to communicate with the computer system 102 using any type of communications link.

The computer system 102 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the multiple column display program 104 can be embodied as any combination of system software and/or application software. Further, the multiple column display program 104 can be implemented using a set of modules 128. In this case, a module 128 can comprise a component that performs a set of actions used by the multiple column display program 104. Further, it is understood that some of the actions discussed herein may not be implemented or additional actions may be implemented by computer system 102.

When the computer system 102 comprises multiple computing devices, each computing device can have only a portion of the multiple column display program 104 installed thereon (e.g., one or more modules 128). However, it is understood that the computer system 102 is only representative of various possible equivalent computer systems that may implement the process described herein. To this extent, in other embodiments, the actions implemented by the computer system 102 can be at least partially implemented by one or more computing devices that include any combination of general and/or specific purpose hardware and/or program code. In each embodiment, the program code and hardware can be provided using standard programming and engineering techniques, respectively.

When the computer system 102 includes multiple computing devices, the computing devices can communicate over any type of communications link. Further, while performing the process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

It is understood that each of the process flows shown and described herein is only illustrative. To this extent, numerous variations of these process flows are possible, and are included within the scope of this disclosure. Illustrative variations include performing one or more processes in parallel and/or a different order, performing additional processes, not performing some processes, and/or the like. To this extent, the multiple column display program 104 can utilize multiple tasks/threads/processes to perform the actions of the processes described herein.

It is further understood that aspects of the invention further provide various alternative embodiments. For example, in one embodiment, the invention provides a computer program stored on at least one computer-readable medium, which when executed, enables a computer system to perform the processes described above. To this extent, the computer-readable medium can include program code, such as the multiple column display program 104, which implement some or all of the process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; a modulated data signal having one or more of its characteristics set and/or changed in such a manner as to encode information in the signal; paper; etc.

In another embodiment, a computer system, such as the computer system 102, can be obtained (e.g., provided, created, maintained, made available, etc.) and one or more programs/systems for performing the process described herein can be obtained (e.g., provided, created, purchased, used, modified, etc.) and deployed to the computer system. To this extent, the deployment can comprise one or more of: (1) installing program code (e.g., multiple column display program 104) on a computing device from a computer-readable medium; (2) adding one or more computing devices to the computer system; and (3) incorporating and/or modifying the computer system to enable it to perform the process described herein.

Aspects of the invention can be also implemented as part of a business method that performs the process described herein on a subscription, advertising, and/or fee basis. That is, a service provider could offer to provide some/all of the components/processes needed to implement scrolling in a document having multiple columns, as described herein. In this case, the service provider can manage (e.g., create, maintain, support, etc.) some or all of the environment 100, such as the computer system 102 and multiple column display program 104, that performs the process described herein for one or more customers. In return, the service provider can receive payment from the customer(s) under a subscription and/or fee agreement, receive payment from the sale of advertising to one or more third parties, and/or the like.

The foregoing description of embodiments of this invention has been presented for purposes of illustration and description. It is not intended to be exhaustive or to limit the invention to the precise form disclosed, and obviously, many modifications and variations are possible.

What is claimed is:

1. A method for scrolling in a multiple-column page of a single document, comprising:
   displaying, from content within the single document, viewable columnar data of a plurality of columns of the multiple-column page of the single document in a display window;
   associating, using the viewable columnar data of each of multiple columns of the multi-column page of the single document, a single different scrollbar with each of the plurality of displayed columns of the single document, where each of the scrollbars is configurable for both synchronous operation and independent operation; and
   selectively enabling one of the synchronous operation and the independent operation of each of the scrollbars;
   where in the synchronous operation, detecting use of any of the scrollbars results in a corresponding scrolling of the multiple-column page of the single document within the display window, and where in the independent operation, detecting use of a selected one of the scrollbars results only in a corresponding scrolling of a column of the multiple-column page of the single document associated with that scrollbar within the display window.

2. The method of claim 1, further comprising:
   preventing another page of the single document from being displayed in the display window during use of any of the scrollbars.

3. The method of claim 1, further comprising:
   displaying, in response to detecting use of the selected one of the scrollbars, at least a portion of a next or previous page of the single document in the display window.

4. The method of claim 1, further comprising:
   displaying, in response to detecting use of the selected one of the scrollbars, at least a portion of a next or previous column of the multiple-column page of the single document in the display window.

5. The method of claim 1, further comprising:
highlighting data in the column of the multiple-column page of the single document in response to detecting use of the scrollbar associated with that column.

6. The method of claim 1, where the scrolling is controlled by operation of at least one of a keyboard, pointing device, button, and software user interface control.

7. A system for scrolling in a multiple-column page of a single document, comprising:
a system that displays, from content within the single document, viewable columnar data of a plurality of columns of the multiple-column page of the single document in a display window; and
a scrolling system for scrolling through the multiple-column page, the scrolling system comprising:
a system that associates, using the viewable columnar data of each of multiple columns of the multi-column page of the single document, a single different scrollbar with each of the plurality of displayed columns of the single document, where each of the scrollbars is configurable for both synchronous operation and independent operation; and
a system that selectively enables one of the synchronous operation and the independent operation of each of the scrollbars;
where in the synchronous operation, detecting use of any of the scrollbars results in a corresponding scrolling of the multiple-column page of the single document within the display window, and where in the independent operation, detecting use of a selected one of the scrollbars results only in a corresponding scrolling of a column of the multiple-column page of the single document associated with that scrollbar within the display window.

8. The system of claim 7, where the scrolling system further comprises:
a system that prevents another page of the single document from being displayed in the display window during use of any of the scrollbars.

9. The system of claim 8, where the scrolling system further comprises:
a system that scrolls to a next or previous page of the single document in response to detecting use of the selected one of the scrollbars, where the system for displaying displays a plurality of columns of the next or previous page, respectfully, in the display window.

10. The system of claim 9, further comprising:
a system for highlighting data in the column of the multiple-column page of the single document in response to detecting use of the scrollbar associated with that column.

11. The system of claim 10, where the scrolling is controlled by operation of at least one of a keyboard, pointing device, button, and software user interface control.

12. A program product stored on a non-transitory computer readable storage medium, which when executed, provides scrolling in a multiple-column page of a single document, the non-transitory computer readable storage medium comprising at least one of:
program code for:
displaying, from content within the single document, viewable columnar data of a plurality of columns of the multiple-column page of the single document in a display window;
associating, using the viewable columnar data of each of multiple columns of the multi-column page of the single document, a single different scrollbar with each of the plurality of displayed columns of the single document, where each of the scrollbars is configurable for both synchronous operation and independent operation; and
selectively enabling one of the synchronous operation and the independent operation of each of the scrollbars;
where in the synchronous operation, detecting use of any of the scrollbars results in a corresponding scrolling of the multiple-column page of the single document within the display window, and where in the independent operation, detecting use of a selected one of the scrollbars results only in a corresponding scrolling of a column of the multiple-column page of the single document associated with that scrollbar within the display window; and program code for:
identifying column breaks encoded with the viewable columnar data of each of the multiple columns of the multi-column page of the single document;
sequencing all of the viewable columnar data of each of the multiple columns into a paging sequence that forms a single virtual column with a columnar data width of the viewable columnar data;
displaying a columnar data width portion of the viewable columnar data of a first column of the plurality of columns of the multiple-column page of the single document in the display window and a single vertical scrollbar, where the columnar data width of the single virtual column and a width of the single vertical scrollbar utilize a width of the display window; and
scrolling, in response to detection of at least one scroll interaction of the single vertical scrollbar, sequentially through the paging sequence of the viewable columnar data of the plurality of columns sequenced into the single virtual column.

13. The program product of claim 12, further comprising program code for:
scrolling, in response to detection of at least one additional scroll interaction of the single vertical scrollbar, to a bottom of the first column of the multiple-column page of the single document; and
displaying, using the paging sequence of the single virtual column, a top portion of a next column of the multiple-column page of the single document in the display window.

14. The program product of claim 12, further comprising program code for:
scrolling, in response to detection of at least one additional scroll interaction of the single vertical scrollbar, to a bottom of a last column of the multiple-column page of the single document;
sequencing the viewable columnar data of at least a first column of a next multiple-column page of the single document into the paging sequence of the single virtual column; and
displaying a top columnar data width portion of the viewable columnar data of the first column of the next multiple-column page of the single document in the display window.

15. The program product of claim 12, further comprising program code for:
scrolling, in response to detection of at least one additional scroll interaction of the single vertical scrollbar, to a top of the first column of the multiple-column page of the single document; and displaying a bottom columnar data width portion of the viewable columnar data of a previous column of the multiple-column page of the single document in the display window.

16. The program product of claim 12, further comprising program code for:
    scrolling, in response to detection of at least one additional scroll interaction of the single vertical scrollbar, to a top of the first column of the multiple-column page of the single document;
    sequencing the viewable columnar data of at least a last column of a previous multiple-column page of the single document into the paging sequence of the single virtual column; and
    displaying a bottom columnar data width portion of the last column of the previous multiple-column page of the single document in the display window.

17. The program product of claim 12, further comprising program code for:
    providing the display window on a device having a limited size display.

18. The program product of claim 12, where the program code for scrolling comprises program code controlled by operation of at least one of a keyboard, pointing device, button, and software user interface control.

* * * * *